United States Patent
Shadpour et al.

(10) Patent No.: US 9,945,738 B2
(45) Date of Patent: Apr. 17, 2018

(54) DEVICES AND METHODS FOR MONITORING AND CONTROLLING TEMPERATURE IN A MICROFLUIDIC ENVIRONMENT

(71) Applicant: GenMark Diagnostics, Inc., Carlsbad, CA (US)

(72) Inventors: Hamed Shadpour, Mission Viejo, CA (US); Sean Ford, Oceanside, CA (US); Jorge Alberto Garces, San Diego, CA (US); Darren S. Gray, Carlsbad, CA (US)

(73) Assignee: GenMark Diagnostics, Inc., Carlsbad, CA (US)

( * ) Notice: Subject to any disclaimer, the term of this patent is extended or adjusted under 35 U.S.C. 154(b) by 899 days.

(21) Appl. No.: 14/206,932

(22) Filed: Mar. 12, 2014

(65) Prior Publication Data

US 2014/0339318 A1  Nov. 20, 2014

Related U.S. Application Data

(60) Provisional application No. 61/800,572, filed on Mar. 15, 2013.

(51) Int. Cl.
*G01K 13/00*  (2006.01)
*G01K 11/16*  (2006.01)
(Continued)

(52) U.S. Cl.
CPC .......... *G01K 13/00* (2013.01); *G01K 11/165* (2013.01); *G05D 23/27* (2013.01); *B01L 3/5027* (2013.01); *G01K 2213/00* (2013.01)

(58) Field of Classification Search
CPC .............. B01L 3/5027; G01N 33/5438; G01K 11/165; G01K 13/00; G01K 2213/00; G05D 23/27

See application file for complete search history.

(56) References Cited

U.S. PATENT DOCUMENTS

2005/0201660 A1* 9/2005 Grot .................. B82Y 20/00
                                                              385/12
2006/0096691 A1  5/2006 Bossi et al.
(Continued)

FOREIGN PATENT DOCUMENTS

WO    WO 01/23091 A1    4/2001
WO    WO 2003/045556 A3  6/2003

OTHER PUBLICATIONS

Basson and Pottebaum, "Measuring the temperature of fluid in a micro-channel using thermochromic liquid crystals," *Exp Fluids*, vol. 53, pp. 803-814 (2012).
(Continued)

*Primary Examiner* — Dennis White
*Assistant Examiner* — Bryan Kilpatrick
(74) *Attorney, Agent, or Firm* — Klarquist Sparkman, LLP

(57) ABSTRACT

The present invention provides improved methods that allow accurate monitoring and/or control of temperature changes in a microfluidic environment. An advantage of the present invention is that the temperature can be monitored and/or controlled at any location within a microfluidic device, especially where a preparation step, an amplification step and/or a detection step is performed. The invention further provides improved microfluidic devices for practicing the methods disclosed and claimed herein.

20 Claims, 2 Drawing Sheets

(51) Int. Cl.
*G05D 23/27* (2006.01)
*B01L 3/00* (2006.01)

(56) References Cited

U.S. PATENT DOCUMENTS

2008/0038810 A1* 2/2008 Pollack ............ B01L 3/502761
 435/283.1
2009/0264308 A1 10/2009 Broer et al.
2010/0272608 A1 10/2010 Penterman et al.

OTHER PUBLICATIONS

Chaudhari et al. "Transient Liquid Crystal Thermometry of Microfabricated PCR Vessel Arrays," *J. Microelectrochemical Systems*, vol. 7:4, pp. 345-355 (1998).
Dabiri, Dana "Digital particle image thermometry/velocimetry: a review," *Exp Fluids*, vol. 46, pp. 191-241 (2009).
Gillot et al. "On chip thermal calibration with 8CB liquid crustal of micro-thermal device for biological applications," *Author manuscript published in I ab on a Chip 7*, (2007) 1600; hal-00264795, version 1-21 (2012).
Goose et al. "Molecular Probes for Thermometry in Microfluidic Devices," *Thermal Nanosystems and Nanomaterials*, Topics in Applied Physics, 118, pp. 301-341 (2009).
Hamlington et al. "Liquid crystal droplet production in a microfluidic device," *Liquid Crystals*, vol. 34:7, pp. 861-870 (2007); DOI 10.1080/0267829061171485.
Hoang et al. "Dynamic temperature measurement in microfluidic devices using thermochromic liquid crystals," *Lab Chip*, vol. 8, pp. 484-487 (2008).
Iles et al. "Thermal optimisation of the Reimer-Tiemann reaction using thermochromic liquid crystals on a microfluidic reactor," *Lab Chip*, vol. 5, pp. 540-544 (2005).
Liu et al. "A nanoliter rotary device for polymerase chain reaction," *Electrophoresis*, vol. 23, pp. 1531-1536 (2002).
Liu et al. "Paperlike thermochromic display," *Applied Physics Letters*, vol. 90:213508 (2007); DOI 10.1063/1.2742781.
Liu et al. "Micro thermoindicators and optical-electronic temperature control for microfluidic applications," vol. 91:093513 (2007); DOI 10.1063/12776848.
Mondal and Venkataraman, "Miniaturized devices for DNA amplification and fluorescence based detection," *Journal of the Indian Institute of Science*, vol. 87:3, pp. 309-332 (2007).
Park et al. Digital particle image velocimetry/thermometry and application to the wake of a heated circular cylinder, *Experiments in Fluids*, vol. 30, pp. 327-338 (2001).
Sequra et al., "Non-encapsulated thermo-liquid crystals for digital particle tracking thermography/velocimetry in microfluidis," *Microfluid Nanofluid*, DOI 10.1007/s10404-012-1063-y (2012).
Smith et al. "Temperature sensing with thermochromic liquid crystals," *Experiments in Fluids*, vol. 30, pp. 190-201 (2001).
Zhang and Xing "Survey and Summary—Miniaturized PCR chips for nucleic acid amplification and analysis: latest advances and future trends," *Nucleic Acids Research*, vol. 35:13, pp. 4223-4327 (2007).

* cited by examiner

DEVICES AND METHODS FOR MONITORING AND CONTROLLING TEMPERATURE IN A MICROFLUIDIC ENVIRONMENT

CROSS-REFERENCE TO RELATED APPLICATION

This patent application claims the benefit of U.S. Provisional Patent Application No. 61/800,572, filed Mar. 15, 2013.

FIELD OF THE INVENTION

The present invention generally relates to the field of thermal management. More specifically, the invention is concerned with devices and methods for monitoring and controlling temperature in a microfluidic environment, particularly in digital microfluidics applications such as electrowetting.

BACKGROUND OF THE INVENTION

The presence and concentration of target biological analytes, such as, nucleic acids or proteins, in a sample fluid containing one or more other molecules can be determined by using the complex binding of these target biological compounds with probes. For example, a set of specific probes, each of which is chosen in order to interact specifically (i.e. hybridize) with one particular target analyte, can be immobilized at specific locations of a biosensor solid substrate. The target analytes are usually labeled with a detectable label molecule (e.g., a colored particle, a fluorophore, or an electrochemically active moiety). By contacting the solid substrate with the sample fluid, the target analytes are fixed at the locations corresponding to their specific probes. The detection of the target analytes in the sample fluid is then operated via the localization of the signals produced by the detectable molecules bound to the target analytes.

Because hybridization is a temperature-dependent phenomenon, temperature control provides significant advantages in this technology, e.g., for nucleic acid analyses. Moreover, nucleic acid analytes typically require amplification prior to detection, and most amplification techniques involve maintaining the fluid sample at one or more temperature(s) for a predetermined amount of time in order to achieve reliable amplification. Thus, accurate temperature control is also important for analyte processing steps preceding detection.

The ability to measure temperature changes of liquids in very small volumes within a microfluidic environment presents a number of technical challenges. Usually, the measurement requires interactions with the liquid by measuring devices which either provide poor contact due to distance and surface area available for measurement or result in heat transfer between the solution and the measuring device that may interfere with accurate measurement. Thus, there is a need for improving, in a cost-effective manner, the temperature control in a microfluidic environment, especially up to the level where substantially a homogeneous temperature within a few tens of degrees Celsius can be achieved. There is a need for a precise and reliable method and device to monitor the temperature, and its distribution, directly at the level of the biosensor substrate. There is also a need for a method of making such improved devices, such that the method is relatively easy to perform and does not significantly increase the cost of the device.

Accordingly, it is an object of the present invention to provide improved methods that permit accurate monitoring and/or control of temperature changes in a microfluidic environment. An advantage of the present invention is that the temperature can be monitored and/or controlled at any location within a microfluidic device where a preparation step, an amplification step or a detection step is performed. A further object of the invention is to provide improved devices for monitoring and/or controlling temperature in a microfluidic environment that can be employed to practice the methods disclosed and claimed herein.

SUMMARY OF THE INVENTION

In one aspect, the invention provides a method for monitoring temperature in a microfluidic chamber. Briefly, the first step of the method involves providing a microfluidic device comprising a substrate, at least one temperature control means for increasing or decreasing temperature, and at least one microfluidic chamber wherein temperature monitoring is desired. The chamber features a bottom surface and a top surface, which together define a vertical dimension of the chamber. The chamber further includes a plurality of temperature sensitive agents that are disposed at different areas of the chamber in order to monitor temperature changes effectuated by the temperature control means. In the second step, the temperature control means is/are employed to adjust temperature in a first area of the chamber to a first target temperature at which at least one of the temperature sensitive agents undergoes a first detectable optical transition. Subsequently, the first optical transition is detected at a plurality of different positions along the vertical dimension of the chamber to determine whether or not the first target temperature has been reached throughout the vertical dimension. One of the advantages provided by the present method is the ability to gauge the temperature in areas of the chamber that are distal from the temperature control element(s), thereby providing a more accurate thermal map of the chamber in three dimensions.

In another aspect, the invention provides a method for controlling temperature in a microfluidic chamber. Briefly, the first step of the method involves providing a microfluidic device comprising a substrate, at least one temperature control means for increasing or decreasing temperature, and at least one microfluidic chamber wherein temperature monitoring is desired. The chamber features a bottom surface and a top surface, which together define a vertical dimension of the chamber. The chamber further includes a plurality of temperature sensitive agents that are disposed at different areas of the chamber in order to monitor temperature changes effectuated by the temperature control means. In the second step, the temperature control means is employed to adjust temperature in at least one area of the chamber to a target temperature at which at least one of the temperature sensitive agents undergoes a detectable optical transition. The optical transition is then detected at a plurality of different positions along the vertical dimension of the chamber to determine whether or not the target temperature has been reached throughout the vertical dimension. In the event the target temperature has not been reached throughout the vertical dimension of the chamber, the adjusting and detecting steps are repeated one or more times until the target temperature has been achieved.

In a third aspect, the invention provides a device for monitoring and/or controlling temperature in a microfluidic chamber. The device includes a substrate, a temperature control means disposed on or proximal to the substrate, and a microfluidic chamber formed on top of the substrate. The chamber features a bottom surface and a top surface, which together define a vertical dimension of the chamber. The chamber further includes a plurality of temperature sensitive agents that are disposed at different areas within the chamber and/or at a plurality of different positions along the vertical dimension of the chamber in order to monitor temperature changes effectuated by the temperature control means. Each of the temperature sensitive agents is configured and adapted to undergo an optical transition at a predetermined target temperature.

Other features and characteristics of the invention, as well as the methods of operation and functions of related elements of structure and the combination of parts, will become more apparent upon consideration of the following description and the appended claims with reference to the accompanying drawings, all of which form a part of this specification, wherein like reference numerals designate corresponding parts in the various figures.

DETAILED DESCRIPTION OF THE INVENTION

1. Definitions

Figure 1:
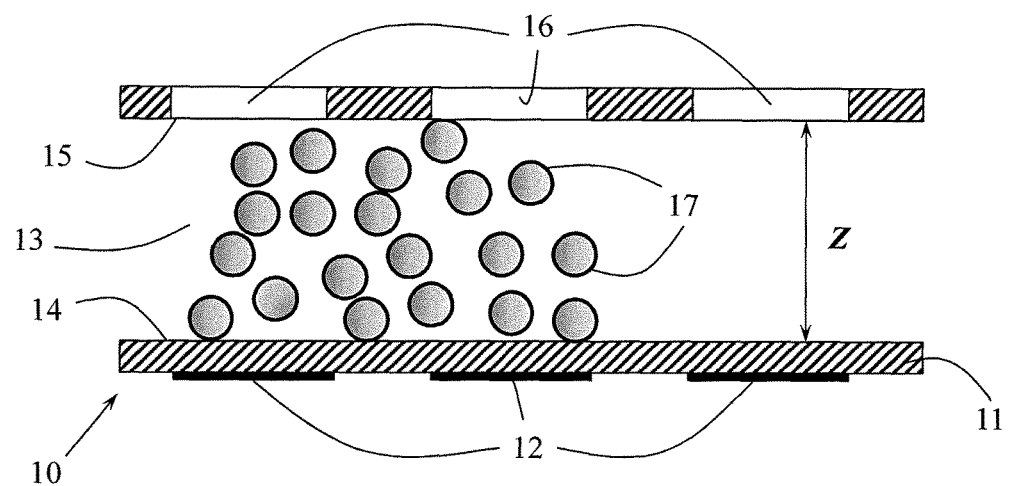
FIG. 1 illustrates one of the embodiments of the present invention, wherein the temperature sensitive agents are included in or coated on the surface of a plurality of particles or beads 17 that are distributed throughout the Z axis of chamber 13.

Unless defined otherwise, all terms of art, notations and other scientific terms or terminology used herein have the same meaning as is commonly understood by one of ordinary skill in the art to which this disclosure belongs. Many of the techniques and procedures described or referenced herein are well understood and commonly employed using conventional methodology by those skilled in the art. As appropriate, procedures involving the use of commercially available kits and reagents are generally carried out in accordance with manufacturer defined protocols and/or parameters unless otherwise noted. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

As used herein, the term "a" or "an" refers to "at least one" or "one or more."

As used herein, when referring to a measurable value such as a parameter, an amount, a temporal duration, and the like, the term "about" is meant to encompass variations of ±10% or less, preferably ±5% or less, more preferably ±1% or less, and still more preferably ±0.1% or less of and from the specified value, insofar such variations are appropriate to perform in the disclosed invention. It is further contemplated that the value to which the modifier "about" refers is itself also specifically, and preferably, disclosed.

The term "monitoring" generally refers to watching, checking, measuring, quantifying or observing for a specific purpose. As used herein, it is particularly applicable to the monitoring of temperature(s) in a microfluidic environment.

The term "controlling" broadly refers to exerting influence on an observable parameter in order to increase, decrease or maintain it at a constant level, as the need may be. As used herein, it is especially applicable to the control of temperature(s) in a microfluidic environment.

As used herein, the term "temperature control means" refers to any means that can be used to selectively alter the temperature of its surroundings, e.g., all devices having at least one electrical heating resistor, a flat textile heating element, a heat pump, a Peltier element, etc.

The term "adjusting" generally refers to changing one or more parameters or characteristics upward or downward in real-time or near-real-time. As used herein, it is particularly applicable to the adjustment of temperature(s) in a microfluidic environment.

The term "detecting" generally refers to sensing, perceiving, determining, establishing or confirming the presence of an expected or desired event or phenomenon. As used herein, it is especially applicable to the detection of optical transitions as a function of thermal changes.

As used herein, the term "microfluidic" refers to a system or device having channels or chambers that are generally fabricated on the micron or submicron scale, e.g., having at least one cross-sectional dimension in the range from about 0.1 μm to less than about 1,000 μm.

The term "chamber" generally refers to a three-dimensional hollow structure that has a top and a bottom and is surrounded by walls of one or more materials. As used herein, it is particularly applicable to three-dimensional structures capable of holding microliter volumes (e.g., about 1 μm to about 1,000 μm) and having a generally solid outer surface that is usually rectangular, square, elliptical or circular in cross-sectional shape. It is to be understood, however, that the term "chamber" as used herein is not limited to any particular shape and may encompass elongated hollow structures also referred to as channels.

The term "substrate" generally refers to a solid, preferably planar, object or surface upon which another material is layered or attached. Solid supports may include, but are not limited to, glass, silicon, metals, polymers, and gels, among others. As used herein, the term is particularly applicable to substrates having appropriate thermal conductivity to effectively indicate temperature changes in the fluid or solid materials they are designed to emulate.

"Vertical dimension" as used herein is a relative term that broadly refers to a dimension measured along an axis substantially orthogonal or perpendicular to a device's substrate. More specifically, the vertical dimension is defined by a Z-axis that is orthogonal to the top and bottom surfaces of a chamber, which are usually horizontal (see, e.g., FIGS. 1-4). In the context of the present application, the vertical dimension preferably ranges from about 1 µm to about 1,000 µm, more preferably from about 10 µm to about 500 µm.

The term "temperature sensitive agent" generally refers to any compound, composition or formulation that responds to a change in temperature with a corresponding reversible change in a detectable optical property, e.g., visible color, wavelength of fluorescent emission, etc. As used herein, each temperature sensitive agent has a distinct temperature or temperature range at which the optical change or transition can be observed. In some embodiments, the temperature-sensitive agents include temperature sensitive liquid crystals (i.e., thermochromic or thermochromatic liquid crystals).

As used herein, the term "liquid crystals" or "LC" specifically refers to liquid crystals that are capable of displaying different colors at different temperatures. The color change for the thermochromic liquid crystals ranges from clear at ambient temperature, through red as temperature increases and then to yellow, green, blue and violet before turning colorless (isotropic) again at a higher temperature. The color-temperature play interval depends on the liquid crystal composition. It can be selected for the bands of about 0.5° C. to about 20° C., and working temperature of about −30° C. to above 120° C., depending on the particular application. Examples of thermochromic liquid crystals include cholesteryl nonanoate or cyanobiphenyls.

As used herein, the term "optical transition" refers to a reversible detectable change in an optical property of a temperature sensitive agent, such as liquid crystals, in response to a change in temperature.

As used herein, the term "target temperature" refers to a desired temperature that may be conducive to a biochemical process, e.g., nucleic acid hybridization or annealing, nucleic acid strand dissociation, nucleic acid extension, protein-protein or protein-nucleic acid binding or dissociation, etc. As used herein, target temperatures may range, without limitation, anywhere from about 35° C. to about 99° C. (just under boiling), preferably from about 50° C. to about 95° C. Specific target temperatures will depend on the process being monitored and/or controlled.

As used herein, the term "immiscible liquid" refers to water-immiscible fluids such as hydrocarbons, fluorocarbons, halocarbons and mixtures thereof, which are soluble in water to an extent of not exceeding approximately 1.0% by weight.

As used herein, the term "encapsulated" refers to a molecule or compound being fully surrounded by or enclosed within a usually spherical shell such as a lipid multilayer structure.

As used herein, the term "deposited" refers to any method of layer formation that is suitable for temperature sensitive agents, e.g., liquid crystals, as is commonly practiced in the industry.

The term "immobilized" broadly refers to various means of attachment to a solid support including both ionic and covalent types of bonding. As used herein, the term preferably refers to attachment via a covalent bond.

As used herein, the term "proximal" refers to a portion of a device that is sufficiently close to the substrate to facilitate efficient heat transfer between the substrate and a temperature control means.

As used herein, the term "electrowetting" generally refers to the effect of an external electric field on the shape of a fluid/fluid interface in contact with a substrate. The effect allows the manipulation of interfacial shapes by applied voltage. The magnitude of the electrowetting effect is controlled by the strength of an electric field, which is sustained by the imposition of a voltage difference across the operating fluids. Electrowetting devices typically employ a liquid/liquid interface formed between one conductive and one non-conductive liquid.

As used herein, the term "self-assembled monolayer" refers to a relatively ordered assembly of molecules spontaneously chemisorbed on a surface, in which the molecules are oriented approximately parallel to each other and roughly perpendicular to the surface. Each of the molecules includes a functional group that adheres to the surface, and a portion that interacts with neighboring molecules in the monolayer to form the relatively ordered array. See, e.g., Laibinis et al., *Science* 1989, 245:845; Bain et al., *J. Am. Chem. Soc.* 1989, 111:7155-64; Bain & Whitesides, *J. Am. Chem. Soc.* 1989, 111:7164-75; U.S. Pat. Nos. 5,620,850; 6,197,515; 6,306,584; 6,322,979; 6,472,148; and 6,809,196, each of which is incorporated by reference. The abbreviated term "SAM" preferably refers to a self-assembled monolayer of a single organic compound (as opposed to a mixed monolayer).

As used herein, the term "capture binding ligand" refers to any molecule that binds specifically to an analyte of interest (i.e., target). When the target analyte is a nucleic acid, the capture binding ligand usually comprises an oligonucleotide. When the target analyte is a protein, the capture binding ligand may comprise an antibody specific for that protein or another protein or fragment thereof that can bind the target with a desired degree of specificity. When the capture binding ligand is a nucleic acid, preferred compositions and techniques are outlined in U.S. Pat. Nos. 5,591,578; 5,824,473; 5,705,348; 5,780,234 and 5,770,369; U.S. Ser. Nos. 08/873,598; 08/911,589; WO 98/20162; WO 98/12430; WO 98/57158; WO 00/16089; WO 99/57317; WO 99/67425; WO 00/24941; PCT US00/10903; WO 00/38836; WO 99/37819; WO 99/57319 and PCT US00/20476; and related materials, all of which are expressly incorporated by reference in their entirety.

As used herein, the term "attachment linker" refers to a molecule that is used to attach a capture binding ligand to a detection electrode. In some embodiments, attachment linkers with covalently attached nucleosides or nucleic acids are covalently attached to an electrode. Thus, one end or terminus of the attachment linker may be attached to the nucleoside or nucleic acid, and the other may be attached to an electrode. The method of attachment of the capture binding ligands to the attachment linker will generally be done as is known in the art, and will depend on both the composition of the attachment linker and the capture binding ligand. Generally, the capture binding ligands are attached to the attachment linker through the use of functional groups on each that can then be used for attachment. Preferred functional groups for attachment are amino groups, carboxy groups, oxo groups and thiol groups.

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, etc., are used for convenience in referring to such component, apparatus, location, feature, or a portion thereof in the drawings and are not intended to be limiting.

2. Methods for Monitoring and/or Controlling Temperature

As briefly discussed above, the first aspect of the present invention is concerned with a new method for monitoring temperature in a microfluidic chamber. The first step of the method involves providing a microfluidic device comprising a substrate (e.g., glass, silicon, metal, polymer, a printed circuit board, etc.), at least one temperature control means for increasing or decreasing temperature (e.g., a device having at least one electrical heating resistor, a flat textile heating element, a heat pump, a Peltier element, etc.), and at least one microfluidic chamber wherein temperature monitoring is desired. The chamber features a bottom surface and a top surface, together defining a vertical dimension of the chamber, which preferably ranges from about 1 µm to about 1 mm, more preferably from about 10 µm to about 500 µm, and most preferably from about 50 µm to about 500 µm. The chamber further includes a plurality of temperature sensitive agents that are disposed at different areas of the chamber in order to monitor temperature changes effectuated by the temperature control means. In the second step, the temperature control means is employed to adjust temperature in a first area of the chamber to a first target temperature at which at least one of the temperature sensitive agents undergoes a first detectable optical transition. Finally, the first optical transition is detected at a plurality of different positions along the vertical dimension of the chamber to determine whether or not the first target temperature has been reached throughout the vertical dimension.

In some embodiments, at least one of the of temperature sensitive agents includes thermochromic liquid crystals. As noted above, the color-temperature play interval of a liquid crystal composition can be selected for the bands of about 0.5° C. to about 20° C., and optical transition temperature of about −30° C. to above 120° C., depending on the application. Selected examples of thermochromic liquid crystals include cholesteryl nonanoate or cyanobiphenyls, and a variety of other liquid crystals having different working temperature ranges are known in the art and available from commercial sources, such as LCR Hallcrest (Glenview, Ill.; e.g., Part Nos. SLN33R59.5C1W, changing from clear to blue at 59.5° C.; SLN33R71.5C1W, changing from clear to blue at 71.5° C.; and SLN33R94.5C1W, changing from clear to blue at 94.5° C.). The optical transitions may occur in the visible range, in which case they can be detected by a camera (e.g., a CMOS or CCD) with the use of LED or another type of illumination. In some embodiments, the optical transitions may be detected using polarized light, a fluorescent microscope, and/or a confocal microscope, which is particularly advantageous for analyzing temperature in different cross-sections of the vertical dimension of the microfluidic chamber.

In some embodiments, the liquid crystals are comprised in liquid droplets, which may be suspended in a water-immiscible filler fluid such as, for example, mineral oil or a silicone based oil. Materials appropriate for forming droplets containing temperature sensitive agents, particularly liquid crystals, include, for instance, nonionic emulsifiers such as polysorbate 20 (Tween® 20) and other suitable surfactants or detergents. Commercially available liquid crystals are usually encapsulated in a polymer shell, with capsule diameters typically ranging from about 10 to about 1000 microns, to exclude them from the surrounding aqueous media. The use of the microcapsules allow altering the surrounding aqueous medium (e.g., by adding a nonionic emulsifiers such as polysorbate 20 (Tween® 20)) with no or minimal effect on the optical properties of the encapsulated liquid crystals. Exemplary concentrations of a nonionic emulsifiers such as polysorbate 20 such as (Tween® 20) suitable for droplet formation in the context of the present invention range from about 0.05% w/v to about 10% w/v, more preferably from about 0.5% w/v to about 5% w/v.

Alternatively, the liquid crystals may be deposited on the surface of particles or beads. The particles or beads may comprise a magnetic or magnetizable material for easier manipulation, or they may be made of a non-magnetic material. In some embodiments, the particles or beads may comprise a polymer material having suitable optical properties to allow detection of the optical transition characteristic of the liquid crystals associated with the particles or beads in question. For example, the particles or beads may be black, white or transparent, depending on the optical characteristics of the liquid crystals.

Figure 2:
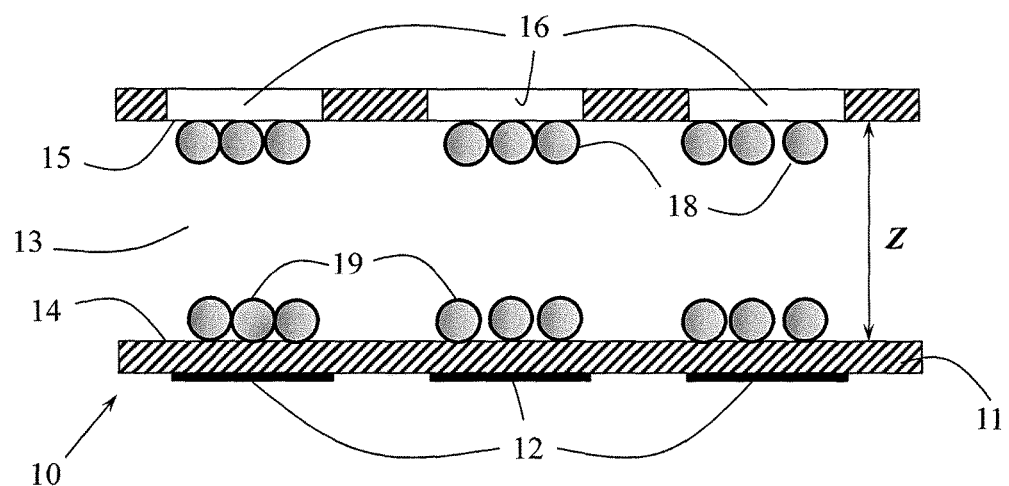
FIG. 2 shows an alternative embodiment of the invention, wherein the temperature sensitive agents are comprised in or coated on the surface of a plurality of particles or beads having two different densities. The lower density particles 18 float to the top surface 15 of the chamber 13, whereas the higher density particles 19 sink to the bottom surface 14.

Referring to FIG. 1, microspheres 17 represent liquid crystals comprised in liquid droplets or deposited on the surface of particles or beads that are distributed along the vertical dimension Z defined by the bottom surface 14 and the top surface 15 of the microfluidic chamber 13. The bottom surface 14 is associated with the thermo conductive substrate 11, which is coupled one or more temperature control means 12. The top surface 15 preferably includes one or more windows 16 that are made of a substantially transparent material to permit observation of optical transitions experienced by the liquid crystals at the temperature(s) or temperature range(s) of interest. Although the microspheres depicted in FIG. 1 are of uniform size, it is to be understood that they may have a range of sizes and/or densities to facilitate distribution said particles or beads along the Z-axis and further to distinguish between liquid crystals featuring different optical transition ranges. As an example, FIG. 2 illustrates an alternative embodiment of the invention wherein beads or particles of at least two different densities are employed. The lower density particles 18 float to the top surface 15 of the microfluidic chamber 13, whereas the higher density particles 19 sink to the bottom surface 14, thereby providing assessments of the lowest and highest temperatures along the Z-axis, respectively, assuming that the temperature control means 12 coupled to the thermo conductive substrate 11 increase the temperature in the chamber from bottom to top.

Figure 3:
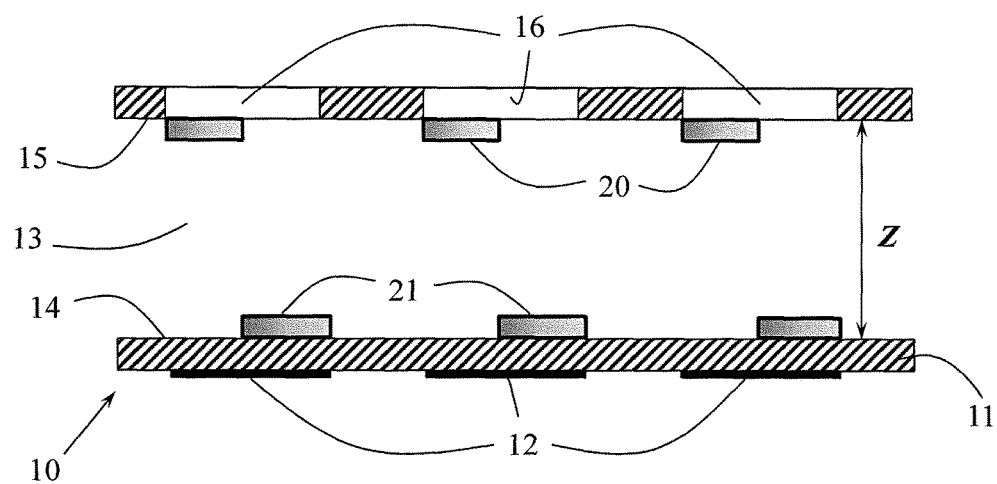
FIG. 3 depicts an embodiment wherein the temperature sensitive agents 20 and 21 are immobilized on the top surface 15 and bottom surface 14, respectively, in a staggered fashion such that both of their optical transitions can be observed through transparent window(s) 16.

In some embodiments, instead of being included in liquid droplets or deposited on the surface of mobile particles of beads, liquid crystals may be immobilized at a plurality or different positions within the microfluidic chamber to detect temperature changes along the vertical dimension Z. As shown in FIG. 3, liquid crystal films 20 and 21 having the same or different optical transition temperature(s) or temperature range(s) may be immobilized on the top (15) and bottom (14) surfaces of the chamber in a staggered fashion such that both of their optical transitions can be observed through one or more transparent window(s) 16.

Figure 4:
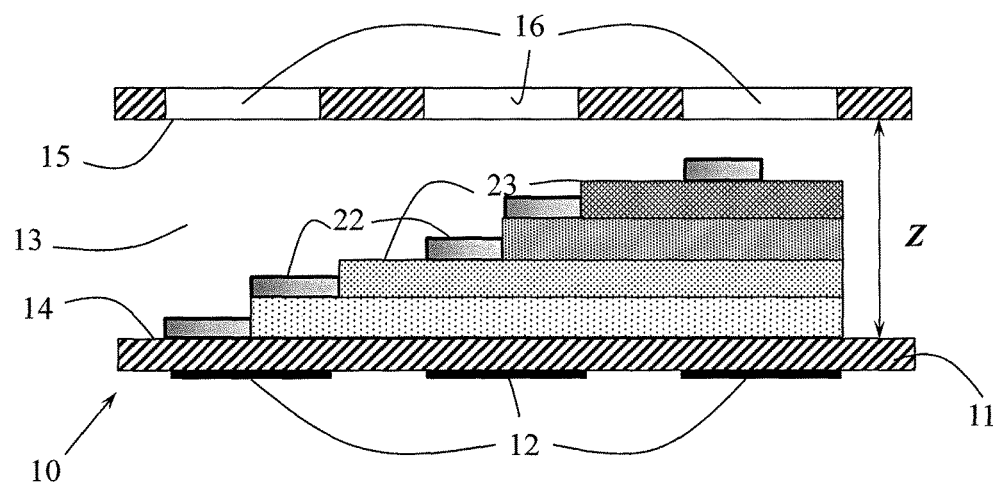
FIG. 4 shows another alternative embodiment, wherein the temperature sensitive agents 22 are immobilized at a plurality of different positions along the Z axis provided by a plurality of thermally conductive layers 23. Much like in FIG. 3, it is contemplated that the temperature sensitive agents are staggered, allowing concurrent detection of multiple optical transitions at different points along the Z axis.

Alternatively, the different positions along the vertical dimension Z may be provided by a plurality of layers (e.g., polymer films) of predetermined height or thickness deposited on the bottom surface of the chamber. This embodiment of the invention is illustrated in FIG. 4, wherein a plurality of liquid crystal films 22 having the same or different optical transition temperature(s) or temperature range(s) are deposited on a plurality of horizontal layers 23, such that temperature changes may be accurately assessed as different positions along the Z-axis. The number, position, thickness, color, and material of the layers may vary depending on the specific application, though it must be appreciated that the layers must have appropriate thermal conductivity and appropriate color not to interfere with temperature measurements and optical assessments. Liquid crystals appear most vibrant against a dark background, but can also be viewed against a clear background, allowing liquid crystal layers stacked directly on top of other liquid crystal layers to be visualized if desired. Because liquid crystals can be formulated to indicate temperature at different colors, it is possible for a single layer to indicate more than one target temperature. If needed, surface property of a polymer film can be modified (e.g., by a plasma treatment) before liquid crystal deposition for better stability of liquid crystals on surface over time. In other embodiments, instead of layers of different height(s), structural features may be built into the geometry of the chamber (e.g., step-like features formed by injection molding) in one or more area(s) of the microfluidic device that is designated for temperature assessment.

As noted above, the methods of the present invention is broadly applicable to monitoring temperature changes associated with a variety of biological or biochemical processes, such as nucleic acid hybridization or annealing, nucleic acid strand dissociation, nucleic acid extension, protein-protein or protein-nucleic acid binding or dissociation, etc. Accordingly, target temperature(s) of interest may range from about 35° C. to about 99° C., preferably from about 50° C. to about 95° C. Exemplary target temperatures used for nucleic acid detection tend to be near the lower end of the range (e.g., 38 to 40±0.5° C.), whereas exemplary target temperatures associated with nucleic acid amplification may be selected from the group consisting of about 59.5±0.5° C. (annealing), about 71.5±0.5° C. (extension) and about 94.5±0.5° C. (denaturation). Additionally, mixtures of liquid crystals having different optical characteristics can be used to indicate multiple temperature ranges.

It is worth noting that the temperature monitoring technique of the present invention may further include an additional temperature adjusting step in the event the target temperature has not been reached throughout said vertical dimension. The additional temperature adjusting step preferably performed automatically using a thermal feedback loop mechanism. In some embodiments, optical sensors can be locked in with heater controllers to maintain designated temperatures inside a droplet, such that that the heaters are activated whenever the thermal crystals became clear, indicating a colder temperature, and deactivated whenever the thermal crystals became colored, indicating a higher temperature.

In some embodiments, the method further includes adjusting temperature in a second area of the chamber, which may be the same as or different from the first area, to a second target temperature, which may be the same as or different from the first target temperature, at which at least one of the temperature sensitive agents undergoes a second optical transition, and subsequently detecting the second optical transition at a plurality of different positions along the vertical dimension of the chamber to determine whether or not the second target temperature has been reached throughout the vertical dimension.

In other embodiments, the method further includes adjusting temperature in a third area of the chamber, which may be the same as or different from the first and/or second area(s), to a third target temperature, which may be the same as or different from the first and/or second target temperature(s), at which at least one of said temperature sensitive agents undergoes a third optical transition, and subsequently detecting the third optical transition at a plurality of different positions along the vertical dimension of the chamber to determine whether or not the third target temperature has been reached throughout the vertical dimension.

As noted above, the use of multiple temperature sensitive agents characterized by different optical transition thresholds can be particularly advantageous in applications requiring more than one different target temperature, such as nucleic acid amplification. Accordingly, in some embodiments, the temperature in the microfluidic chamber may be adjusted according to a predefined protocol appropriate for a nucleic acid hybridization reaction. In other embodiments, the temperature in the chamber may be adjusted according to a predefined protocol suitable for a nucleic acid amplification reaction, e.g., a polymerase chain reaction (PCR) or an isothermal amplification reaction, such as, for example, transcription mediated amplification (TMA), self-sustained sequence replication (3 SR), nucleic acid sequence-based amplification (NASBA), signal mediated amplification of RNA technology (SMART), strand displacement amplification (SDA), rolling circle amplification (RCA), loop-mediated isothermal amplification of DNA (LAMP), isothermal multiple displacement amplification (IMDA), single primer isothermal amplification (SPIA), helicase-dependent amplification (HDA), circular helicase-dependent amplification (cHDA), or restriction exonuclease mediated amplification, as described in the art.

As noted above, the present temperature monitoring method can be particularly useful in digital microfluidics and electrowetting applications. An exemplary digital microfluidics platform has been developed by Advanced Liquid Logic (ALL), such as described in U.S. Pat. Nos. 8,268,246, 8,208,146, 8,202,686, 8,137,917, 8,088,578, 8,041,463, 8,007,739, 7,998,436, 7,943,030, 7,939,021, 7,919,330, 7,901,947, 7,851,184, 7,822,510, 7,816,121, 7,815,871, 7,763,471, 7,727,723, 599,832, 7,569,129 and 7,439,014, all of which are expressly incorporated by reference in their entirety and in particular for the manufacture, composition, geometries, etc. of the electrowetting electrodes and coatings. These technologies rely on the formation of microdroplets and the ability to independently transport, merge, mix and/or process the droplets, using electrical control of surface tension (i.e., electrowetting). In general, liquid samples are contained within a microfluidic device between two parallel plates. One plate contains etched drive electrodes on its surface while the other plate contains either etched electrodes or a single, continuous plane electrode that is grounded or set to a reference potential. Hydrophobic insulation covers the electrodes and an electric field is generated between electrodes on opposing plates. This electric field creates a surface-tension gradient that causes a droplet overlapping the energized electrode to move towards that electrode. Through proper arrangement and control of the electrodes, a droplet can be transported by successively transferring it between adjacent electrodes. The patterned electrodes can be arranged in a two dimensional array so as to allow transport of a droplet to any location covered by that array. The space surrounding the droplets may be filled with a gas such as air or an immiscible fluid such as a silicone-based or mineral oil.

Accordingly, in some embodiments of the invention, the substrate may include a printed circuit board (PCB), preferably comprising a plurality of interconnected electrodes configured and adapted to transport, merge, mix and/or process a liquid droplet using electrowetting. In some embodiments, the PCB may further include one or more detection electrodes capable of electrochemical detection of a target analyte of interest. Systems that integrate electrowetting and electrochemical detection on a single PCB are described in detail in a commonly owned and co-pending application Ser. No. 61/717,887, filed Oct. 24, 2012, the entire content of which is incorporated herein by reference. In some embodiments, the detection electrode is made of gold and includes a capture binding ligand, optionally comprising an attachment linker to facilitate immobilization on the electrode's surface, and a monolayer, such as a self-assembled monolayer (SAM). In some embodiments, SAMs may include insulators and/or conductive oligomers. As discussed above, SAMs have been described extensively in the art, e.g., Laibinis et al., Science 1989, 245:845; Bain et al., J. Am. Chem. Soc. 1989, 111:7155-64; Bain & Whitesides, J. Am. Chem. Soc. 1989, 111:7164-75; U.S. Pat. Nos. 5,620,850; 6,197,515; 6,306,584; 6,322,979; 6,472,148; and 6,809,196, all of which are incorporated herein by reference.

Employing the present temperature monitoring technique in conjunction with electrowetting applications has a number of technical advantages. For example, temperature can be assessed by observing optical changes while the droplets or particles containing liquid crystals are either paused or in motion. Liquid crystals mixed with surfactants and solvents can be transported by electrowetting forces, letting the operator to control their horizontal location. Multiple droplets containing liquid crystals that are sensitive to different temperature zones can be moved and screened adjacent to each other and simultaneously, without affecting each other, due to the digital nature of the microchip and printed circuit board. The volume of each droplet containing liquid crystals can be adjusted, and droplets containing liquid crystals that are sensitive to different temperature zones can be formulated and merged on PCB pads in controlled ratios to expand the application to different temperature areas and/or to improve the sensitivity of optical detection at any particular temperature. Further, droplets containing liquid crystals may be used as a rapid quality control tool to screen the temperature gradients on every cartridge at the beginning of each run, then "parking" them at waste reservoirs without leaving any residue on the base PCB due to the presence of hydrophobic coating layers on the PCB and top plate and the use of an immiscible filler fluid such as silicone oil.

A second aspect of the present invention provides an improved method for controlling temperature in a microfluidic chamber. The first step of the method involves providing a microfluidic device comprising a substrate (e.g., glass, silicon, metal, polymer, a printed circuit board, etc.), at least one temperature control means for increasing or decreasing temperature (e.g., a device having at least one electrical heating resistor, a flat textile heating element, a heat pump, a Peltier element, etc.), and at least one microfluidic chamber wherein temperature monitoring is desired. The chamber features a bottom surface and a top surface, together defining a vertical dimension of the chamber, which preferably ranges from about 1 µm to about 1 mm, more preferably from about 10 µm to about 500 µm, and most preferably from about 50 µm to about 500 µm. The chamber further includes a plurality of temperature sensitive agents that are disposed at different areas of the chamber in order to monitor temperature changes effectuated by the temperature control means. In the second step, the temperature control means is employed to adjust temperature in at least one area of the chamber to a target temperature at which at least one of the temperature sensitive agents undergoes a detectable optical transition. The optical transition is then detected at a plurality of different positions along the vertical dimension of the chamber to determine whether or not the target temperature has been reached throughout the vertical dimension. In the event the target temperature has not been reached throughout the vertical dimension of the chamber, the adjusting and detecting steps are repeated until the target temperature has been reached.

In some embodiments, the final step of the method is carried out automatically using a thermal feedback loop mechanism. An assortment of feedback paradigms, such as proportional-integral-derivative (PID) control, are available. As noted above, optical sensors may be locked in with heater controllers to maintain designated temperatures inside a droplet, such that that the heaters become engaged whenever the thermal crystals became clear, indicating a colder temperature, and deactivated whenever the thermal crystals became colored, indicating a higher temperature. In preferred embodiments, the method is capable of maintaining a temperature throughout the vertical dimension within about 1° C. of the target temperature, more preferably within about 0.5° C. of the target temperature.

3. Devices for Monitoring and/or Controlling Temperature

A further aspect of the present invention provides an improved device for monitoring and/or controlling temperature in a microfluidic chamber. The device includes a substrate, a temperature control means disposed on or proximal to the substrate, and a microfluidic chamber formed on top of the substrate. The chamber features a bottom surface and a top surface, together defining a vertical dimension of the chamber, which preferably ranges from about 1 µm to about 1 mm, more preferably from about 10 µm to about 500 µm, and most preferably from about 50 µm to about 500 µm. The chamber further includes a plurality of temperature sensitive agents that are disposed at different areas within the chamber and/or at a plurality of different positions along the vertical dimension of the chamber in order to monitor temperature changes effectuated by the temperature control means. Each of the temperature sensitive agents is configured and adapted to undergo an optical transition at a predetermined target temperature. Exemplary embodiments of the present device are shown in FIGS. 1-4, which have been described in detail in the preceding section.

As noted above, at least one of the of temperature sensitive agents preferably includes a thermochromic liquid crystal composition, which may include cholesteryl nonanoate, a cyanobiphenyl, or a variety of other LCs having different working temperature ranges that are known in the art and available from commercial sources, such as LCR Hallcrest (Glenview, Ill.; e.g., Part Nos. SLN33R59.5C1W, changing from clear to blue at 59.5° C.; SLN33R71.5C1W, changing from clear to blue at 71.5° C.; and SLN33R94.5C1W, changing from clear to blue at 94.5° C.). As discussed above, the optical transitions may occur in the visible range, in which case they can be detected by a camera (e.g., a CMOS or CCD) with the use of LED or another type of illumination. In some embodiments, the optical transitions may be detected using polarized light, a fluorescent microscope, and/or a confocal microscope, which is particularly advantageous for analyzing temperature in different cross-sections of the vertical dimension of the microfluidic chamber.

As noted above, the liquid crystals may be comprised in liquid droplets, which may be suspended in a water-immiscible filler fluid such as, for example, mineral oil or a silicone based oil, as shown in FIG. 1. Materials appropriate for forming droplet containing temperature sensitive agents, particularly liquid crystals, include, for instance, nonionic emulsifiers such as polysorbate 20 (Tween® 20) and other suitable surfactants or detergents. As noted above, commercially available liquid crystals are usually encapsulated in a polymer shell, with capsule diameters typically ranging from about 10 to about 1000 microns, to exclude them from the surrounding aqueous media. Exemplary concentrations of a nonionic emulsifiers such as polysorbate 20 such as (Tween® 20) suitable for droplet formation in the context of the present invention range from about 0.05% w/v to about 10% w/v, more preferably from about 0.5% w/v to about 5% w/v.

Alternatively, the liquid crystals may be deposited on the surface of particles or beads, as illustrated in FIGS. 1 and 2. The particles or beads may comprise a magnetic or magnetizable material for easier manipulation, or they may be made of a non-magnetic material. In some embodiments, the particles or beads may comprise a polymer material having suitable optical properties to allow detection of the optical transition characteristic of the liquid crystals associated with the particles or beads in question. For example, the particles or beads may be black, white or transparent, depending on the optical characteristics of the liquid crystals. As noted above, the particles or beads may have a range of different sizes and/or densities (FIG. 2) to facilitate distribution said particles or beads along the vertical dimension of the chamber and further to distinguish between liquid crystals having different optical transition ranges.

In some embodiments, the liquid crystals may be immobilized at a plurality or different positions within the microfluidic chamber to detect temperature changes along the vertical dimension, as shown in FIGS. 3 and 4. The different positions along the Z-axis may include the top and bottom surfaces of the chamber, or alternatively they may be provided by a plurality of layers (e.g., polymer films) of predetermined height or thickness deposited on the bottom surface of the chamber, as shown in FIG. 4. The number, thickness, color, and material of the layers may vary depending on the specific application, though it must be appreciated that the layers must have sufficient thermal conductivity and appropriate color not to interfere with temperature measurements and optical assessments. As noted above, liquid crystals typically appear most vibrant against a dark background, but can also be viewed against a clear background, allowing liquid crystal layers stacked directly on top of other liquid crystal layers to be visualized if desired. Because liquid crystals can be formulated to indicate temperature at different colors, it is possible for a single layer to indicate more than one target temperature. If needed, surface property of a polymer film can be modified (e.g., by a plasma treatment) before liquid crystal deposition for better stability of liquid crystals on surface over time. Further, instead of layers of different height(s), structural features may be built into the geometry of the chamber (e.g., step-like features formed by injection molding) in one or more area(s) of the microfluidic device that is designated for temperature assessment.

As discussed above, the substrate of the present device may include a printed circuit board (PCB), preferably comprising a plurality of interconnected electrodes configured and adapted to transport, merge, mix and/or process a liquid droplet using electrowetting. In some embodiments, the PCB may further include one or more detection electrodes capable of electrochemical detection of a target analyte of interest. In some embodiments, the detection electrode is made of gold and includes a capture binding ligand, optionally comprising an attachment linker to facilitate immobilization on the electrode's surface, and a monolayer, such as a self-assembled monolayer (SAM). In some embodiments, SAMs may include insulators and/or conductive oligomers.

EXAMPLES

Example 1

In this experiment, 950 μL TE buffer was mixed with 5 μL of a nonionic emulsifiers such as polysorbate 20 (Tween® 20) and approximately 45 μL LC-70 or LC-80 (LCR Hallcrest, Glenview, Ill.) thermochromic liquid crystals. This mixture was used to test the temperature inside a microfluidic cartridge which was filled with silicon oil as a filler liquid. This mixture was added to one reservoir on the cartridge and approx. 1 μL was dispensed using electrowetting. The droplet was then transported through PCR zones on this cartridge to test the temperature inside the cartridge. The electrowetting and heating (from bottom of the cartridge) was performed using a commercially available R110 instrument (Advanced Liquid Logic, Morrisville, N.C.). The electrowetting movement of the thermochromic liquid crystals was successful and a transition in color from red to green to blue was observed for both liquid crystal mixtures when they passed through appropriate thermal zones inside the cartridge with temperatures set above their color-transition points.

In similar experiment, LC-71.5 and LC 94.5 thermochromic liquid crystals were obtained from LCR Hallcrest with better accuracy in delivering a transition color for testing the 72° C. and 95° C. PCR zones, respectively. To make it suitable for electrowetting on cartridges (see above), 50 pt of silicon oil was mixed with approx. 50 μL of the LC-71.5 or LC-94.5 at 65° C. to 85° C. then mixed immediately with a solution of 450 μL TE buffer and 50 μL of a nonionic emulsifiers such as polysorbate 20 (Tween® 20) for at least 1 min. In separate experiments, the above mixture (LC-71.5 or LC-94.5) was added into a cartridge reservoir, dispensed and transported in the thermal zones in a cartridge. The electrowetting was successful and a change in color was observed in corresponding thermal PCR zones.

Example 2

In this experiment, thermochromic liquid crystals with a color transition from clear to blue color at 94.5° C. (LCR Hallcrest, Part No. SLN33R94.5C1W) were used to calibrate the actual liquid temperature on a microfluidic cartridge, and to determine the effect of mixing on temperature distribution. One-microliter droplets of liquid crystals in aqueous solution were introduced to a temperature-controlled microfluidic device, heated from below with an external heater. Results of this experiment are briefly summarized in Table 1 below. The crystals were used to determine that 101° C. at the heater was required to raise the microchannel to 94.5° C. Further, the crystals indicated that mixing induced by moving the fluid back and forth along the channel resulted in the need to raise the heater temperature to 102° C. in order to raise the fluid to 94.5° C. Presumably, an increase in heat dissipation and/or thermal uniformity of the fluid was responsible for this mixing result. Without the crystals, an array of thermal sensors would have been required to measure the fluid droplet across its range of positions, and across the range of positions within the droplet. Particularly in microfluidics, such an array of sensors would have significantly altered the thermal characteristic of the setup, thus invalidating the measurements.

TABLE 1

| Heater Set Point (° C.) | Color without Mixing | Color with Mixing |
| --- | --- | --- |
| 100 (and below) | clear/grey | clear/grey |
| 101 | Blue | clear/grey |
| 102 (and above) | Blue | blue |

While the present invention has been described and shown in considerable detail with reference to certain illustrative embodiments, including various combinations and sub-combinations of features, those skilled in the art will readily appreciate other embodiments and variations and modifications thereof as encompassed within the scope of the present invention. Moreover, the descriptions of such embodiments, combinations, and sub-combinations is not intended to convey that the inventions requires features or combinations of features other than those expressly recited in the claims. Accordingly, the present invention is deemed to include all modifications and variations encompassed within the spirit and scope of the following appended claims.

The invention claimed is:

1. A device for monitoring and/or controlling temperature in a microfluidic chamber, the device comprising:
    a) a substrate;
    b) a temperature controller disposed on or proximal to said substrate; and
    c) a microfluidic chamber formed on top of said substrate, the chamber comprising:
        (i) a bottom surface and a top surface defining a vertical dimension; and
        (ii) a plurality of temperature sensitive agents disposed at a plurality of different areas within said chamber and/or at a plurality of different positions along said vertical dimension, wherein each of said temperature sensitive agents is configured to undergo an visible transition at a predetermined target temperature and wherein said plurality of temperature sensitive agents are liquid crystals.

2. The device of claim 1, wherein said liquid crystals are comprised in a liquid droplet.

3. The device of claim 1, wherein said liquid crystals are comprised in a immiscible fluid.

4. The device of claim 3, wherein said immiscible fluid is silicone oil or mineral oil.

5. The device of claim 2, wherein said droplet comprises polysorbate 20 (TWEEN® 20 detergent).

6. The device of claim 5, wherein the concentration of TWEEN® 20 detergent in said droplet ranges from about 0.05% to about 10%.

7. The device of claim 1, wherein said liquid crystals are deposited on the surface of particles or beads.

8. The device of claim 1, wherein said liquid crystals are immobilized at a plurality of different positions along said vertical dimension.

9. The device of claim 1, wherein said substrate comprises a printed circuit board (PCB).

10. The device of claim 9, wherein said PCB comprises a plurality of electrodes configured and adapted to transport a liquid droplet by electrowetting.

11. A digital microfluidic chamber comprising temperature sensitive liquid crystals wherein a first portion of temperature sensitive liquid crystals undergoes a visible transition at a first target temperature.

12. The digital microfluidic chamber of claim 11, wherein a second portion of temperature sensitive liquid crystals undergoes a visible transition at a second target temperature.

13. The digital microfluidic chamber of claim 12, wherein the temperature sensitive liquid crystals are transported by electrowetting from said first target temperature to said second target temperature.

14. The digital microfluidic chamber of claim 11, wherein the temperature sensitive liquid crystals are in a liquid drop comprising oil and a nonionic emulsifier.

15. The digital microfluidic chamber of claim 11 and a temperature controller proximal to said digital microfluidic chamber.

16. The digital microfluidic chamber of claim 11, wherein the digital microfluidic chamber comprises a printed circuit board (PCB) coated with a hydrophobic insulation.

17. A microfluidic chamber comprising a PCB and temperature sensitive liquid crystals in a liquid drop comprising oil and a nonionic emulsifier.

18. The microfluidic chamber of claim 17, wherein the temperature sensitive liquid crystals undergo a visible transition at a target temperature.

19. The microfluidic chamber of claim 17, wherein the PCB is coated with a hydrophobic insulation.

20. The microfluidic chamber of claim 17 and a temperature controller proximal to said microfluidic chamber.

* * * * *